Dec. 24, 1935.  J. L. CREVELING  2,025,226
LUBRICATING DEVICE
Original Filed Sept. 17, 1931  2 Sheets-Sheet 1
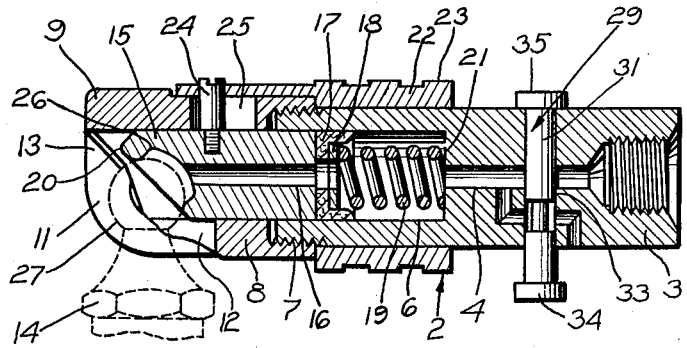
Fig. 1
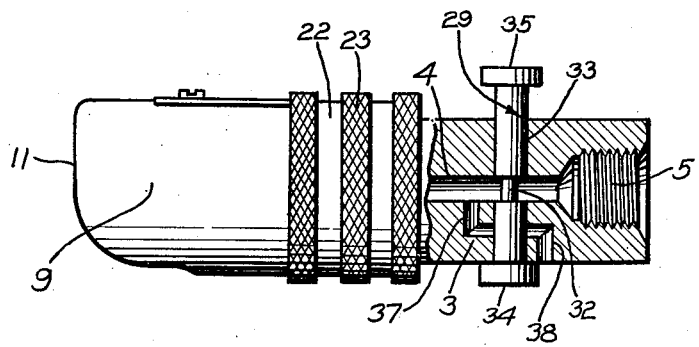
Fig. 2
Fig. 3
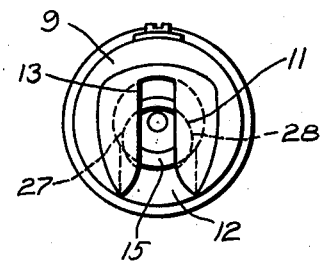
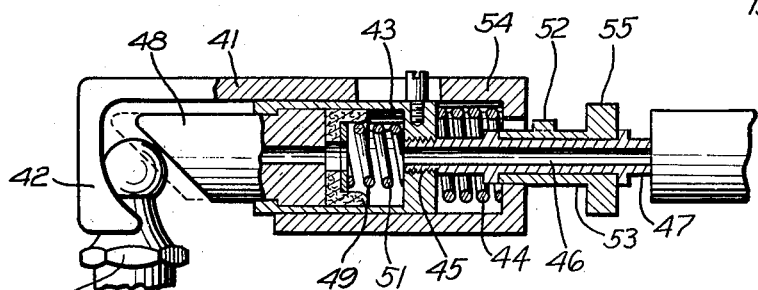
Fig. 4
INVENTOR.
JOHN L. CREVELING
BY
ATTORNEY.

Patented Dec. 24, 1935

2,025,226

UNITED STATES PATENT OFFICE 2,025,226

LUBRICATING DEVICE

John L. Creveling, near Tucson, Ariz., assignor to The Lubrication Corporation, a corporation of Delaware Original application September 17, 1931, Serial No. 563,407, now Patent 2,010,140, August 6, 1935. Divided and this application December 24, 1934, Serial No. 759,018

8 Claims. (Cl. 285—143)

This invention relates to improvements in lubricating devices and more particularly to devices for coupling a source of grease, or other lubricant supply to a fitting or nipple to be lubricated.

This application is a division of my copending application Serial No. 563,407 entitled "Lubricating devices" filed September 17, 1931 which has matured into Patent No. 2,010,140, granted August 6, 1935.

An object of this invention is to provide an improved lubricant-pressure operated clamp type coupler capable of convenient attachment and detachment to and from a lubricant receiving fitting thereby to facilitate efficient lubricant servicing of the fitting.

Another object is to provide a coupler of the character described wherein the coupler is capable of being released from the fitting or nipple irrespective of pressure lock when attached to a "frozen" fitting.

Further objects will be apparent after reading the following specification and claims, and after consideration of the accompanying drawings forming a part of the specification in which:

Fig. 1 is a sectional view of a lubricant-pressure operated clamp type coupler constructed in accordance with the invention;

Fig. 2 is a view, partially in section, of the coupler of Fig. 1 illustrating the pressure release valve in its normal and inoperative position;

Fig. 3 is an end elevation of the coupler of Fig. 2;

Fig. 4 is a view, partially in section, of another form of the coupler;

Figure 5:
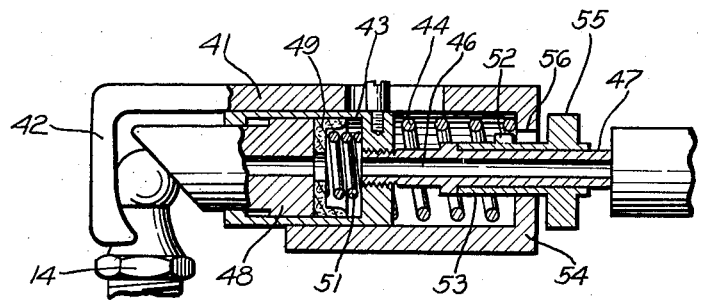
Fig. 5 is a view of the coupler of Fig. 4 illustrating the pressure release mechanism in its normal and inoperative position.

With reference to Figs. 1 and 2 the coupler 2 therein illustrated comprises a casing generally indicated at 3 formed with a longitudinal bore extending throughout. This bore is of relatively small cross section at 4 but is enlarged at its rearward end 5 and is there formed with internal screw threads for attachment to a source of lubricant supply. It is also enlarged at its forward end to form a chamber 6 for purposes later to be described.

Means are provided for positioning the fitting to be lubricated in cooperating pockets associated with the casing 3. The forward end of the casing 3 is formed with external screw threads 7 onto which is screwed the rearward threaded extension 8 of a clamp sleeve 9. The sleeve 9 forms, in effect, a part of the casing 3 and provides a clamping member partially closing the forward end of the casing. For this purpose, the forward end 11 of the sleeve 9 is partially closed and provided with a lateral opening 12 through which the head of a fitting to be lubricated may be inserted and through which the neck of the fitting may, if desired, extend while the fitting is being lubricated. The forward end 11 of the sleeve 9 is also provided with a slot 13 through which the neck of the fitting may extend while the fitting is being lubricated.

Means are provided for resiliently clamping the ball head of a fitting, such as a fitting 14, within the forward end of the sleeve 9. Partly within the enlarged bore, or chamber 6, of the casing 3 and partly within the sleeve 9 is a plunger, or nozzle, 15 provided with a central bore 16 through which bore lubricant may pass toward the fitting to be lubricated. Rearwardly of the plunger 16 and within the chamber 6 there is located a piston washer 17 of leather or other suitable material and contacting with the piston washer 17 is a metallic washer 18. A compression spring 19 located within the chamber 6 and bearing at its opposite ends upon the washer 18 and the end wall 21 of the chamber 6 respectively is provided thereby to urge the plunger 15 forward yieldingly into contact with the fitting to be lubricated.

Means are provided for moving the plunger 15 back against the action of the spring 19 whenever such manual movement of the plunger is desired. Surrounding a portion of the casing 3 and a portion of the sleeve 9 is an operating sleeve 22 formed with a knurled portion 23. The sleeve 22 has inserted therethrough a screw 24 one end of which is turned into a threaded opening in the plunger 15. The screw 24 is adapted to slide in a slot 25 formed in the sleeve 9. Thus the operating sleeve may be used to retract the plunger 15, against the action of the spring 19, to allow the insertion of the ball head of the fitting 14 between the plunger and clamping member. The sleeve may be used for the purpose of withdrawing the plunger 15 from contact with the ball head of the fitting after the fitting has been lubricated. However, the ball head of the fitting may normally be inserted without manual operation of the plunger 15 by means of the sleeve 22, inasmuch as the insertion of the ball head will normally of itself force the plunger 15 back against the action of the spring 19.

It is to be noted that the lubricant pressure is adapted to aid the spring in clamping the ball head of the fitting securely between the face 20 of the plunger and the end 13 of the casing. As the lubricant flows into the casing through the bores 5 and 4 and into the chamber 6, it builds up pressure in the chamber 6 which acts upon the rearward end of the plunger 15 through the piston washer 17 and thus aids the spring 19 in urging the plunger 15 forward into contact with the ball head of the fitting 14, and after such contact in urging the plunger and the ball head of the fitting both forward so that the ball head is firmly clamped between the opposed portions of the end 11 of the casing and the plunger face 20. A pocket 26 formed in the face 20 of the plunger 15 and having a circular outline is adapted to receive a zone of the ball-shaped head of the fitting, said zone extending throughout substantially one-half of the surface of the fitting head.

In clamping the coupler upon the ball head of the fitting 14 the plunger 15 moves into contact with the head of the fitting thereby forcing the fitting head toward the end 11 of the casing and into a pair of concave pockets 27 and 28 which are formed respectively in the opposed portions of the end of the clamping sleeve 9, the plunger 15 being urged forwardly by the spring 19, by the lubricant pressure in the chamber 6, or by a combination of these forces.

A valve 29 located in the rearward portion of the casing 3 between the bore 5 and chamber 6 is provided for controlling the passage of lubricant under pressure from a source of supply into the chamber 6 of the coupler from the bore 5 and for relieving lubricant pressure within the chamber 6 thereby to enable the operator to detach the coupler from the fitting when the coupler has been attached to a "frozen" fitting through which lubricant may not pass. The valve 29 may comprise a cylindrical member 31, having a diametrically reduced portion 32 intermediate its length, which member is slidably mounted in a bore 33 extending transversely through the casing 18 and intercepting the bore 4. During normal operation of the coupler, the valve may be maintained in the position illustrated in Fig. 2 thus to permit the free passage of lubricant through the bore 4 into the chamber 6. Means for shifting the valve 29 and for limiting the longitudinal movement thereof may comprise handles or buttons 34 and 35 formed at opposite ends thereof.

For the purpose of releasing pressure within the chamber 6 to enable the coupler to be removed from a "frozen" fitting, I have provided by-pass passageways 37 and 38 through the casing 3, the passageway 37 communicating with the bore 4 and the passageway 38 communicating with the atmosphere. Movement of the valve 29 to the position shown in Fig. 1 causes the reduced portion 32 of the valve to register with the adjacent ends of the by-pass passageways thereby to establish communication between the passageways and to permit lubricant pressure from within the chamber 6 and a portion of the bore 4 to fall to atmospheric pressure. At such time the valve 29 functions to close the bore 4 at a point rearwardly of the passageway 37.

I have thus provided a simple and efficient clamp type coupler for servicing lubricant receiving fittings which when applied to a frozen fitting may be removed therefrom by releasing fittting.

lubricant pressure within the chamber of the pressure responsive clamping instrumentality by the mere shifting of the valve 29 from its normal position as shown in Fig. 2 to "release" position, as shown in Fig. 1.

In Figs. 4 and 5 I have disclosed a device designed to accomplish a similar purpose. Therein I have shown a casing 41 having its forward end 42 formed with pockets for the reception of the fitting 14. The forward end 42 of the casing is shown for the sake of simplicity as a conventional claw, but it is to be understood that I prefer to use an improved clamping end such as one similar to that shown in Figs. 1 and 3. Within the casing 41 there is slidably mounted a cylinder 43 normally urged forward in the casing by a spring 44. The cylinder 43 is formed with an opening 45 communicating with a lubricant supply conduit 47 having a bore 46. Within the cylinder 43 there is mounted a plunger 48, a piston washer 49 and a spring 51 corresponding in function and design to the plunger 15, the piston washer 17, and the spring 19 shown in Fig. 1. The cylinder 43, for the purpose of simplicity, has been illustrated as formed in one part although in practice the cylinder may obviously comprise two or more parts in order to facilitate the introduction of the plunger head, piston washer and spring therein. A lug 52 placed on a sleeve 53 mounted for rotation between flanges formed on the conduit 47 is designed to be moved normally forward by the spring 44 to a position within the casing 41 as shown in Fig. 5. With the parts in the positions illustrated in Fig. 5 rotation of the sleeve 53 causes the lug 52 to turn within the casing 41 and catch against the rear end 54 of the casing. For the purpose of providing easy rotation of the sleeve 53 and manipulation of this catch device, a manually engageable member 55 is located on the sleeve 53. In order to release the coupler in case of a hydraulic lock, the sleeve 53 is rotated until the lug 52 is in register with the slot 56, whereupon it may be pulled back thereby expanding the pressure chamber within the cylinder 43 and relieving the pressure tending to lock the coupler and fitting together. In Fig. 4 I have shown the coupler in the latter position.

Figure 6:
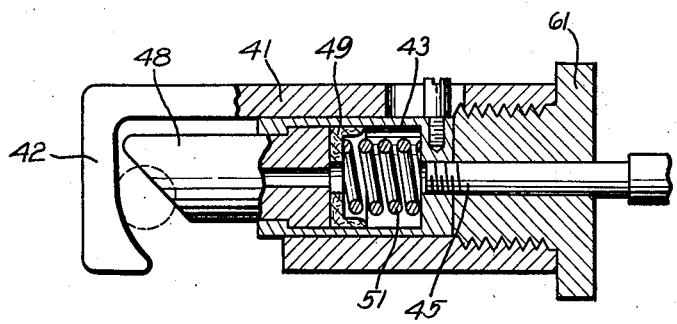
Fig. 6 is a view, similar to Fig. 4, of another form of the coupler.
Figure 7:
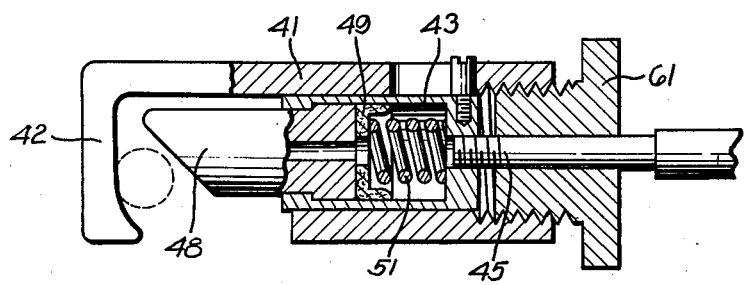
Fig. 7 is a view of the coupler of Fig. 6 in pressure release position.

Figs. 6 and 7 disclose a device somewhat similar to that shown in Figs. 4 and 5. Therein similar parts are designated by like reference numerals and only dissimilar parts are described in detail. Instead of the latching devices formed by the elements 52 and the rear end 54 of the casing 41, I have provided the rear end of the casing with a screw plug 61 which bears upon the cylinder 43 and is adapted to be screwed into the casing 41. This plug corresponds in functional purpose to the latch device shown in Figs. 4 and 5.

It is believed that the operation of the several forms of my improved coupler will be apparent from the above description. Should the coupler become pressure locked by reason of excessive lubricant pressure being applied to lubricate a "frozen" fitting, the pressure may be relieved in the case of the device shown in Figs. 1 to 3 by operating the valve 29. It can be relieved in the device shown in Figs. 4 and 5 by turning the handle 55 and releasing the lug 52 from its contact with the casing 41. In the case of the devices shown in Figs. 6 and 7, the pressure may be relieved by unscrewing the plug 61 and thus allowing the cylinder 43 and its cooperating plunger 48 to be backed away from the It is to be understood that the above described embodiments of the invention are for the purpose of illustration only and various changes may be made therein without departing from the spirit and scope of the invention.

I claim:

1. A coupler for servicing a lubricant receiving fitting comprising, in unitary assembly, a tubular plunger arranged for sealing engagement with a lubricant receiving fitting, a clamping member engageable with said fitting, means associated with said plunger and said clamping member and operative yieldingly to urge said members toward said fitting to clamp the fitting therebetween, means facilitating manual movement of the members relatively away from one another to disengage the fitting, means responsive to lubricant under pressure admitted to said coupler to urge said plunger and clamp member toward one another thereby to augment the pressure applied to said fitting through said members by said yielding means in clamping the coupler upon said fitting, and manually operated means for reducing the lubricant pressure in said pressure responsive means at will.

2. A coupler for servicing a lubricant receiving fitting comprising, in unitary assembly, a tubular plunger arranged for sealing engagement with a lubricant receiving fitting, a clamping member engageable with said fitting, means associated with said plunger and said clamping member and operative yieldingly to urge said members toward said fitting to clamp the fitting therebetween, means facilitating manual movement of the members relatively away from one another to disengage the fitting, means responsive to lubricant under pressure admitted to said coupler to urge said plunger and clamp member toward one another thereby to augment the pressure applied to said fitting through said members by said yielding means in clamping the coupler upon said fitting, and manually operated means for reducing the lubricant pressure in said pressure responsive means at will, said last named means including a valve operative when in one position to admit lubricant to said pressure responsive means and when in another position to establish communication between said pressure responsive means and atmosphere.

3. A coupler for servicing a lubricant receiving fitting comprising, in unitary assembly, a tubular plunger arranged for sealing engagement with a lubricant receiving fitting, a clamping member engageable with said fitting, means associated with said plunger and said clamping member and operative yieldingly to urge said members toward said fitting to clamp the fitting therebetween, means facilitating manual movement of the members relatively away from one another to disengage the fitting, means responsive to lubricant under pressure admitted to said coupler to urge said plunger and clamp member toward one another thereby to augment the pressure applied to said fitting through said members by said yielding means in clamping the coupler upon said fitting, and manually operated means for reducing the lubricant pressure in said pressure responsive means at will, said last named means including a member normally maintaining said pressure responsive means in a fixed operative relationship with respect to said clamp member and operable, at will, to cause a bodily shift of a part of the pressure responsive means whereby the lubricant capacity of said pressure responsive means is increased.

4. In a lubricant pressure operated clamp coupler for servicing lubricant receiving fittings, a fitting engaging clamp member, a cylinder, a tubular plunger slidably mounted in said cylinder and in alignment with said clamp member, said plunger being arranged for sealing engagement with a fitting, means limiting the movement of said plunger within said cylinder, means for admitting lubricant under pressure to said cylinder whereby the plunger is urged toward the clamping member to clamp said fitting therebetween and whereby lubricant may flow through the bore of said plunger into said fitting, and manually operable means for releasing the cylinder whereby it may move away from said clamp member.

5. In a lubricant pressure operated clamp coupler for servicing lubricant receiving fittings, a fitting engaging clamp member, a cylinder, a tubular plunger slidably mounted in said cylinder and in alignment with said clamp member, said plunger being arranged for sealing engagement with a fitting, means limiting the movement of said plunger within said cylinder, means for admitting lubricant under pressure to said cylinder whereby the plunger is urged toward the clamping member to clamp said fitting therebetween and whereby lubricant may flow through the bore of said plunger into said fitting, and manually operable means for releasing the cylinder whereby it may move away from said clamp member, said last named means including a threaded plug forming an abutment for the rearward end of said cylinder.

6. In a lubricant pressure operated clamp coupler for servicing lubricant receiving fittings, a fitting engaging clamp member, a cylinder, a tubular plunger slidably mounted in said cylinder and in alignment with said clamp member, said plunger being arranged for sealing engagement with a fitting, means limiting the movement of said plunger within said cylinder, means for admitting lubricant under pressure to said cylinder whereby the plunger is urged toward the clamping member to clamp said fitting therebetween and whereby lubricant may flow through the bore of said plunger into said fitting, and manually operable means for moving the cylinder away from said clamp member, said last named means including a member fixed against longitudinal movement relatively to said cylinder and arranged to be engaged and disengaged at will with said clamping member thereby to lock the cylinder against movement or to permit movement of the cylinder as desired.

7. In a lubricating device, a coupler for servicing a lubrication fitting comprising a casing, a clamping member slidably mounted in said casing for contacting the head of said fitting, grease pressure means for moving said clamping member, and means for releasing the grease pressure from its action upon said clamping means, said releasing means comprising a sleeve mounted within said casing and within which said clamping means is mounted, an extension secured to said sleeve, a lug on said extension adapted to contact with a portion of said casing and means to rotate said extension to bring said lug into and out of contact with said portion of said casing.

8. A coupler for servicing a lubricant receiving fitting comprising a tubular plunger arranged for sealing engagement with a lubricant receiving fitting, a clamping member engageable with said fitting, resilient means yieldingly urging said plunger and clamping member toward the fitting to clamp the fitting therebetween, means having operative connection with said plunger and movable relatively to the clamping member and adapted to be grasped by an operator for manually urging the plunger away from the clamping member, means responsive to lubricant under pressure to urge said plunger and clamp member toward each other, and manually operable means for reducing the pressure in said pressure responsive means at will.

JOHN L. CREVELING.